Patented Apr. 9, 1935

1,997,340

UNITED STATES PATENT OFFICE 1,997,340

LITHIUM SILICON COMPOSITION

Hans Osborg, Teaneck, N. J., assignor to Maywood Chemical Works, Maywood, N. J., a corporation of New Jersey No Drawing. Original application July 8, 1930, Serial No. 466,584, now Patent No. 1,869,494. Divided and this application July 28, 1932. Serial No. 625,543

9 Claims. (Cl. 23—204)

The present invention relates to compositions containing lithium and silicon which are stable and which can be used industrially for various purposes.

It is an object of the invention to provide stable compositions containing silicon and lithium which can be made, handled and sold as an article of commerce and which can be manufactured in a simple, practical and satisfactory manner on a commercial scale.

It is a further object of the invention to provide compositions containing lithium and silicon which are non-deliquescent and which are practically unaffected by oxygen or nitrogen in dry air at room temperature.

It is another object of the invention to provide a method of producing compositions containing lithium and silicon which contain lithium and silicon in amounts proportional to the amounts of lithium and silicon used in the reacting mixture.

It is also within the contemplation of the invention to provide relatively stable and highly reactive compositions containing lithium and silicon which can be used industrially for various useful purposes.

Other objects and advantages of the invention will become apparent from the following description:

Broadly stated, the present invention contemplates the provision of compositions of lithium and silicon which are stable even at temperatures in excess of 500° C., 600° C. or 700° C., which can be stored for relatively long periods of time without substantially any deterioration and which are chemically active and especially adapted for the refining, purification and improvements of metals and alloys. The lithium-silicon compositions embodying the present invention have relatively high specific gravities and solidification points as compared with prior products and are generally dense, hard and brittle. Table I gives the specific gravity of a few typical lithium-silicon compositions embodying the present invention.

Table I

| Specimen Nos. | Composition | Specific gravity |
|---|---|---|
| 1 | About 40% Si and about 60% Li | About 1. |
| 2 | About 50% Si and about 50% Li | About 1.17 (1.15–1.18). |
| 3 | About 60% Si and about 40% Li | About 1.40 (1.3–1.5). |
| 4 | About 75% Si and about 25% Li | About 1.72 (1.70–1.75). |

The solidification points of the present lithium-silicon compositions vary with the lithium and silicon contents and Table II gives the solidification points of a few typical compositions. It is to be noted that generally the compositions do not have clear cut melting points, although in some instances distinct melting or fusion points have been observed.

Table II

| Specimen Nos. | Composition | Solidification point |
|---|---|---|
| 1 | About 40% Si—about 60% Li | About 500° C.–550° C. |
| 2 | About 50% Si—about 50% Li | About 625° C. |
| 3 | About 60% Si—about 40% Li | About 680° C.–700° C. |
| 4 | About 75% Si—about 25% Li | About 700° C.–750° C. |

In making the determinations of the solidification points, the compositions were heated and reheated to several times above about 700° C. After the determinations, the products were observed to be without change in composition. In other words, no decomposition apparently occurred and no distillation of constituents took place. This feature of the present invention is important, as it demonstrates the outstanding and critical difference from prior art lithium-silicon products and the present products.

The properties possessed by lithium-silicon compositions are valuable particularly from an industrial point of view. For instance, the present compositions can be powdered at ordinary atmospheric temperatures or in the cold with gentle dry grinding. If vigorous grinding is employed, sparking occurs. The lump product can be stored in a stoppered bottle for relatively long periods of time. It is unnecessary to evacuate the bottle as was necessary with some prior art products. The only change which takes place is the formation of a white film in moist air. This film apparently protects the solid substance from further attack. Moreover the present product is non-deliquescent and has a gray or gray-bluish color. In contrast to the foregoing properties the prior art product, such as Moissan's, is deliquescent and decomposes to a powder when exposed to the air.

Chemically and metallurgically, the present lithium-silicon composition is very active. It reacts violently with water to form spontaneously combustible products. When the composition is immersed in a caustic alkali solution or in aqueous ammonia, hydrogen is evolved. In the metallurgical treatment of molten metals and alloys, it has been found that the composition acts beneficially and refines, purifies and improves the treated metal or alloy. From a practical and industrial point of view, lithium-silicon compositions having a silicon content varying from about 40% to about 85% are believed to be the most important.

The improved lithium-silicon compositions described herein may be produced in any appropriate manner. It is preferred to employ a process which comprises heating a mixture of lithium and silicon at a temperature lying within a range from about 400° C. to about 700° C. in a chamber under a high or practically absolute vacuum or in an inert atmosphere of rare gas or its equivalent. When a mixture of lithium and silicon is treated by my method, I obtain several different compositions which depend upon the amount of lithium and silicon used in the reacting mixture. One type consists of a multiplicity of substantially uniform, dark silvery gray crystals. A second type consists of blue orchid masses in the form of plates somewhat resembling slate.

A third type of crystals are light gray in color which appear to carry free lithium. This lithium seems to be the amount in excess of that needed to form the composition of silicon and lithium. These aforesaid crystals changed from their original color to a purplish blue on the edge portions thereof upon exposure to the atmosphere. Usually this color change occurs after an exposure to the atmosphere of about two to three seconds.

Lithium-silicon compositions of the first type are hard and brittle and have a metallic luster. The outer surface or skims of these compositions take on a coat of decomposition products, mostly carbonates and nitrides, which protect the interior thereof. Compositions of the second and third types are friable, fall to a powder in the air and react violently with water.

Upon subjecting the aforesaid crystals to analysis, it was found that silicon and lithium contents were as follows:

*Specimens of Type I*

| | | |
|---|---|---|
| 1 | 40–42% Li | 58–60% Si |
| 2 | 50–53% Li | 47–49% Si |
| 3 | 60–62% Li | 38–40% Si |

*Specimens of Type II*

| | | |
|---|---|---|
| 4 | 8–9% Li | 90–92% Si |

*Specimens of Type III*

| | | |
|---|---|---|
| 5 | 90% Li | 10% Si |

The amounts of raw materials used as ingredients in the production of the aforesaid alloys are as follows:

*Ingredients for Type I compositions*

| | | |
|---|---|---|
| 1 | 43% Li | 57% Si |
| 2 | 53% Li | 47% Si |
| 3 | 60% Li | 40% Si |

*Ingredients for Type II compositions*

| | | |
|---|---|---|
| 4 | 10% Li | 90% Si |

*Ingredients for Type III compositions*

| | | |
|---|---|---|
| 5 | 90% Li | 10% Si |

It will be observed that the percentage of each component present in the finished alloy is practically directly proportional to the percentage of the component present in the reacting ingredients and that there is practically no loss.

The following examples describe procedures for producing the improved high-temperature lithium-silicon compositions.

Example No. 1

A mixture containing about 53 parts lithium and about 47 parts of silicon is heated in an appropriate crucible to a temperature of about 600° C. The heating is carried on under a vacuum which is preferably practically complete. After the lithium is fused and the reaction temperature is reached, the lithium and silicon combine with each other and form a fused mass. Upon cooling the fused mass, a solid body of substantially uniform dark silvery gray crystals can be observed. These crystals change from a silvery gray color to a purplish blue color on the edge portions thereof when exposed to the temperature for a relatively short period, say about five seconds. An analysis of a composition made in accordance showed that silicon was present to the extent of about 47% and lithium was present to the extent of about 53%. After the initial color change, it was found that the crystals were non-deliquescent and could be handled in dry air. In practice, it is preferred to keep the crystals in a stoppered bottle.

Example No. 2

A mixture of about 20.8 parts of lithium and about 28.3 parts of silicon is heated in a crucible to a temperature of about 600° C. under practically a complete vacuum. After thoroughly reacting and fusing, the entire mass is permitted to solidify. The solidified body thus produced is dark gray in color on the outside and silvery gray on the inside and is constituted of a mass of small crystals. An analysis of the mass of the crystals made according to the foregoing method, showed that silicon was present to the extent of about 58–60% and lithium was present to the extent of about 40–42%. The crystals acted the same as the crystals produced in Example No. 1.

Example No. 3

A mixture of about 41.6 parts of lithium and about 28.0 parts of silicon is heated in a crucible to a temperature of about 600° C. The heating is carried on under a practically complete vacuum. A product produced in accordance with the foregoing has a silvery gray color which becomes discolored upon exposure to the air. An analysis of the mass made by the foregoing method, showed that the product contained about 40% silicon and about 60% lithium. The crystals in said mass acted the same as noted in connection with Example No. 1.

In the foregoing examples I have specified that the heating is carried out in a vacuum but the invention is not limited to this mode of procedure. Other appropriate procedures can be employed. For instance, instead of employing a vacuum, I may heat the lithium and silicon in an atmosphere of inert gas or gases such as rare gases like helium. Instead of rare gases, an atmosphere of lithium or silicon or a mixture thereof may be employed. A lithium atmosphere, however, is rather costly and I recommend preferably heating the mixture of lithium and silicon under a practically complete vacuum.

I have found that I can also produce my new composition of matter by reacting lithium and silicon in the vapor phase at an elevated temperature and by condensing the product of a reaction in any suitable manner as by cooling. This process is carried on to the exclusion of air and is preferably conducted under a high vacuum. When thus conducted, the condensed product has practically the same composition and properties as noted hereinabove in connection with the illustrative examples.

In some instances, I have found it desirable to use a compound of silicon, such as iron silicide, copper silicide, nickel silicide or the like instead of silicon. For instance by heating a mixture containing about 50 parts of lithium and 50 parts of iron silicide containing about 80% silicon in a crucible to a temperature of about 600° C. under a high vacuum, I have been able to obtain a relatively stable composition of lithium and silicon. The product of the aforesaid reaction has a gray color and becomes discolored upon exposure to the atmosphere. An analysis of the product showed that silicon was present to the extent of about 51.5%, lithium was present to the extent of about 41.9% and iron constituted approximately the balance.

In practice I have found it desirable to add an excess of iron silicide so as to embed the lithium-silicon composition in a shell of iron silicide or to distribute the lithium-silicon composition in a mass of iron silicide. Instead of using an excess of iron silicide, an excess of silicon can be used in the foregoing examples and the lithium-silicon composition will then be embedded in a shell of silicon. In other instances copper silicide, etc., can be employed instead of iron silicide.

The foregoing mixtures of lithium-silicide and iron silicide are useful in the iron industry whereas the foregoing mixtures of lithium silicide and copper silicide are useful in the copper industry.

In some cases, a lower percentage or amount of silicon may be employed so as to embed the lithium-silicon composition in lithium.

It is to be observed that the present invention provides lithium-silicon compositions which are distinctly different from prior art products which are described in J. W. Mellor's Comprehensive Treatise on Inorganic and Theoretical Chemistry (Vol. VI, pages 168 at seq.); O. Honigschmid's Karbide und Silicide, Halle a. S., (1914); H. Moissan's Le Four Electrique, Paris (1897) and London (1904); and Moissan, Compt. Rend., Vol. 134, page 1083 (1902) and Vol. 135, page 1284 (1902); and Bull. Soc. Chim. (3) Vol. 29, 443 (1903).

It is to be noted that the present composition is especially useful as an improving, purifying and scavenging agent. The composition has been found to be useful in purifying and scavenging processes and particularly in the processes disclosed in my co-pending applications, Serial #467,625, filed July 12, 1930 now Pat. No. 1,869,495; Serial #480,179, filed September 6, 1930 now Pat. No. 1,869,496; Serial #582,490 now Pat. No. 1,869,497, Serial #582,491 now Pat. No. 1,869,498, Serial #582,492 now Pat. No. 1,869,499, Serial #582,493 now Pat. No. 1,869,979, and Serial #582,494 now Pat. No. 1,869,980, filed December 21, 1931.

The present application is a division of my co-pending application, Serial No. 466,584, filed July 8, 1930, now Patent No. 1,869,494, and entitled "Compositions containing lithium and silicon and process of producing same".

I claim:

1. A high temperature lithium-silicon composition composed of lithium and silicon and substantially free from decomposition even at temperatures of the order of 700° C. and under inert atmospheres.

2. A stable, high temperature lithium-silicon composition composed of lithium and silicon and being non-deliquescent.

3. A high temperature lithium-silicon composition of the character set forth in claim 1 which contains iron silicide.

4. A high temperature lithium-silicon composition of the character set forth in claim 1 which contains nickel silicide.

5. A high temperature lithium-silicon composition of the character set forth in claim 1 which contains copper silicide.

6. A stable, high temperature lithium-silicon composition composed of about 40% silicon and about 60% lithium and possessing a specific gravity of about one and a solidification point of about 500° C. to about 550° C.

7. A stable, high temperature lithium-silicon composition composed of about 60% silicon and about 40% lithium and possessing a specific gravity of about 1.3 to about 1.5 and a solidification point of about 680° C. to about 700° C.

8. A stable, high temperature lithium-silicon composition composed of about 75% silicon and about 25% lithium and possessing a specific gravity of about 1.7 and a solidification point of about 700° C. to about 750° C.

9. A lithium-silicon composition containing about 25% to about 60% lithium, said composition being substantially free from decomposition even at temperatures of the order of 700° C. and under an inert atmosphere, and being dense, hard and brittle, and having a metallic luster.

HANS OSBORG.